(12) United States Patent
Yunten

(10) Patent No.: US 9,986,020 B2
(45) Date of Patent: May 29, 2018

(54) YUNTEN'S WEB APPLICATION METHODOLOGY AND WEB PROGRAMMING LANGUAGE (YWAM AND WPL)

(71) Applicant: Tamer Yunten, Christiansburg, VA (US)

(72) Inventor: Tamer Yunten, Christiansburg, VA (US)

( * ) Notice: Subject to any disclaimer, the term of this patent is extended or adjusted under 35 U.S.C. 154(b) by 0 days. days.

(21) Appl. No.: 14/797,289

(22) Filed: Jul. 13, 2015

(65) Prior Publication Data

US 2016/0006795 A1 Jan. 7, 2016

Related U.S. Application Data

(63) Continuation of application No. 14/045,811, filed on Oct. 4, 2013, now Pat. No. 9,116,706.

(51) Int. Cl.
  *H04L 29/08* (2006.01)
  *G06F 9/44* (2018.01)
  *H04L 29/06* (2006.01)

(52) U.S. Cl.
  CPC ............... *H04L 67/10* (2013.01); *G06F 8/34* (2013.01); *H04L 67/42* (2013.01)

(58) Field of Classification Search
  None
  See application file for complete search history.

(56) References Cited

U.S. PATENT DOCUMENTS

| | | | | |
|---|---|---|---|---|
| 8,356,100 B2* | 1/2013 | Zhu | ........................ | H04L 67/02 709/203 |
| 9,350,763 B1* | 5/2016 | McHugh | ................. | H04L 65/00 |
| 2010/0281107 A1* | 11/2010 | Fallows | .................... | G06F 9/54 709/203 |
| 2012/0096116 A1* | 4/2012 | Mislove | .............. | H04L 67/2814 709/217 |
| 2012/0324358 A1* | 12/2012 | Jooste | ....................... | G06F 9/54 715/733 |
| 2013/0097239 A1* | 4/2013 | Brown | .................... | H04L 67/02 709/204 |
| 2013/0290516 A1* | 10/2013 | Eaton | .................. | G06F 17/3089 709/224 |
| 2013/0318148 A1* | 11/2013 | Atamel | ............... | G06F 17/3089 709/203 |
| 2014/0075486 A1* | 3/2014 | Wang | .................. | H04L 67/2823 725/68 |

* cited by examiner

*Primary Examiner* — Daxin Wu

(57) ABSTRACT

This invention introduces a structured software engineering methodology for developing interactive network application systems that use a web browser as a user-dialog engine. The methodology uses two server types: an Application Server for instantiating and executing an application instance in binary code, and an HTTP Server for delivering to the user's browser the textual HTML+Javascript user-dialog documents used by this application instance during its execution. An application is accessed by executing at the user's browser an Application Instantiation Page (AIP) which is a part of this invention. The methodology is built into a notational programming language.

39 Claims, 11 Drawing Sheets

Example instantiation and execution of a web application.

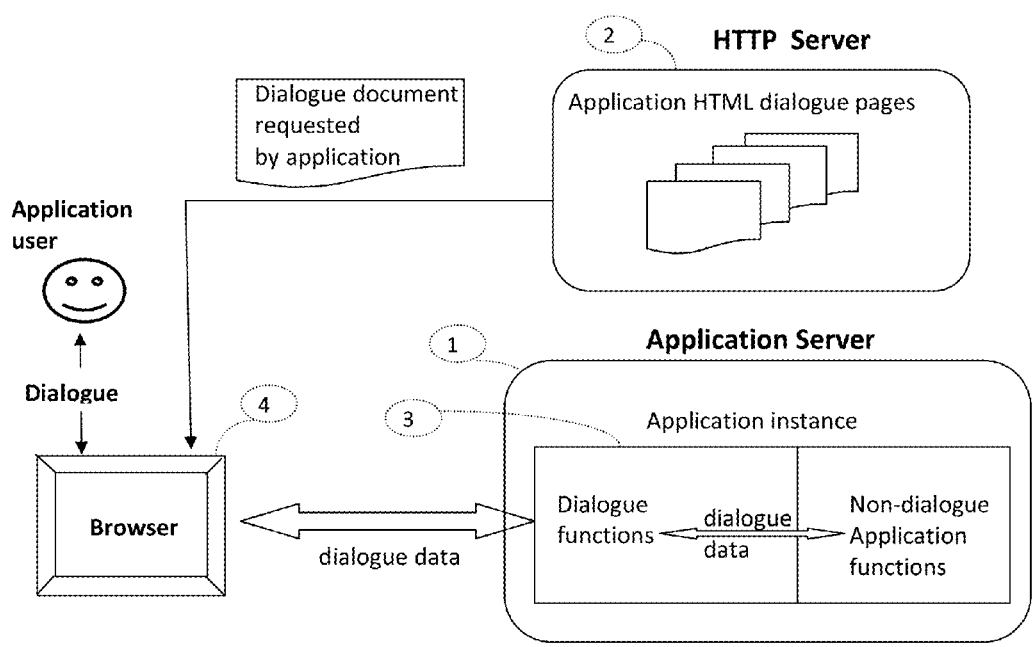
Figure 1. A high-level view of execution of a WEB application.

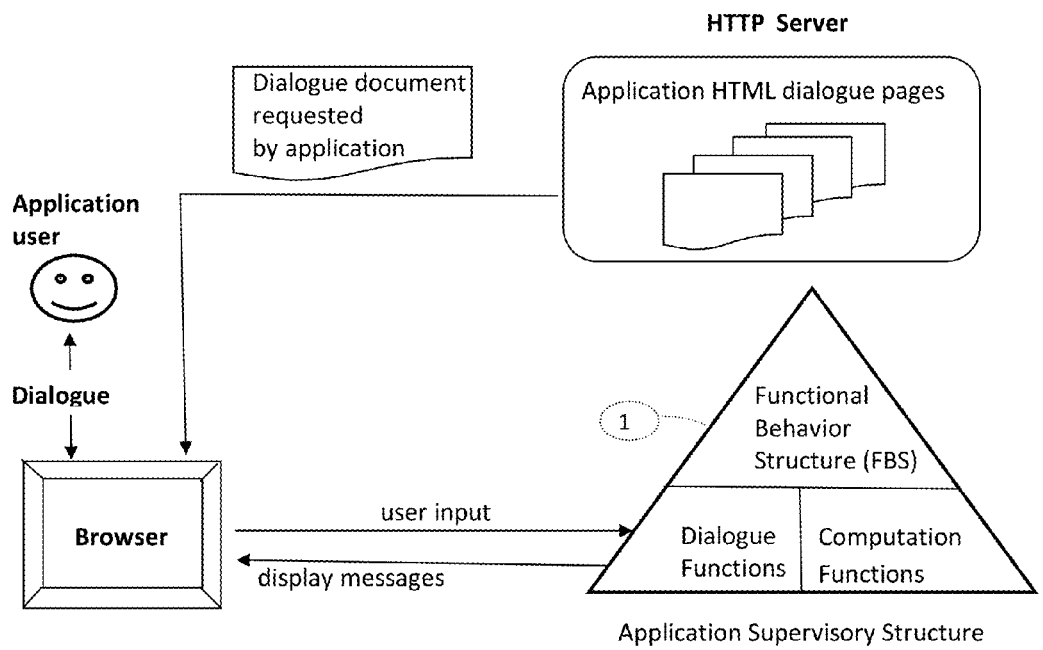
Figure 2 . Execution of a WEB Application Program constructed as a Supervisory Structure.

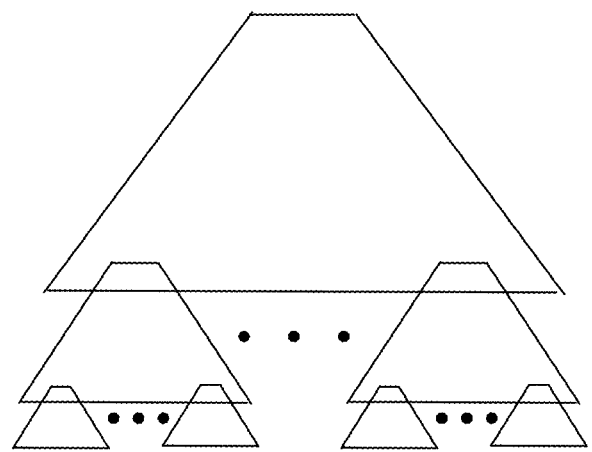
Figure 3. Supervisory structure composed of supervisory cells.
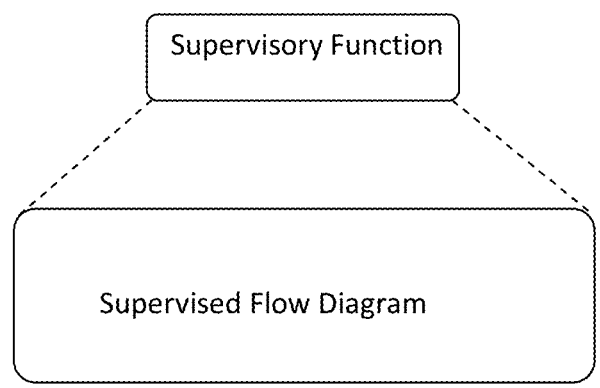
Figure 4. Supervisory cell of a supervisory structure.

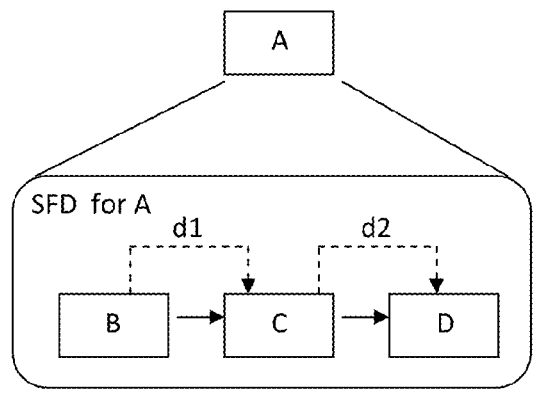
Figure 5. An example supervisory cell and its SFD.
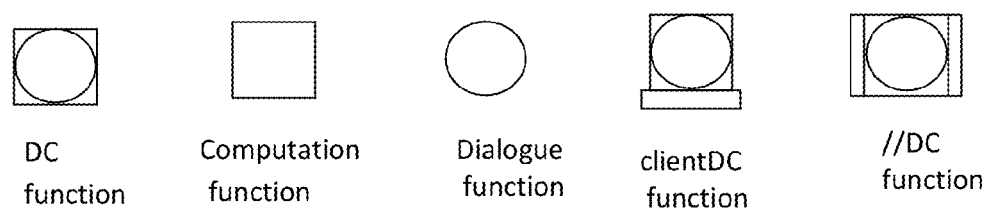
Figure 6. Function symbols of a WEB application program.

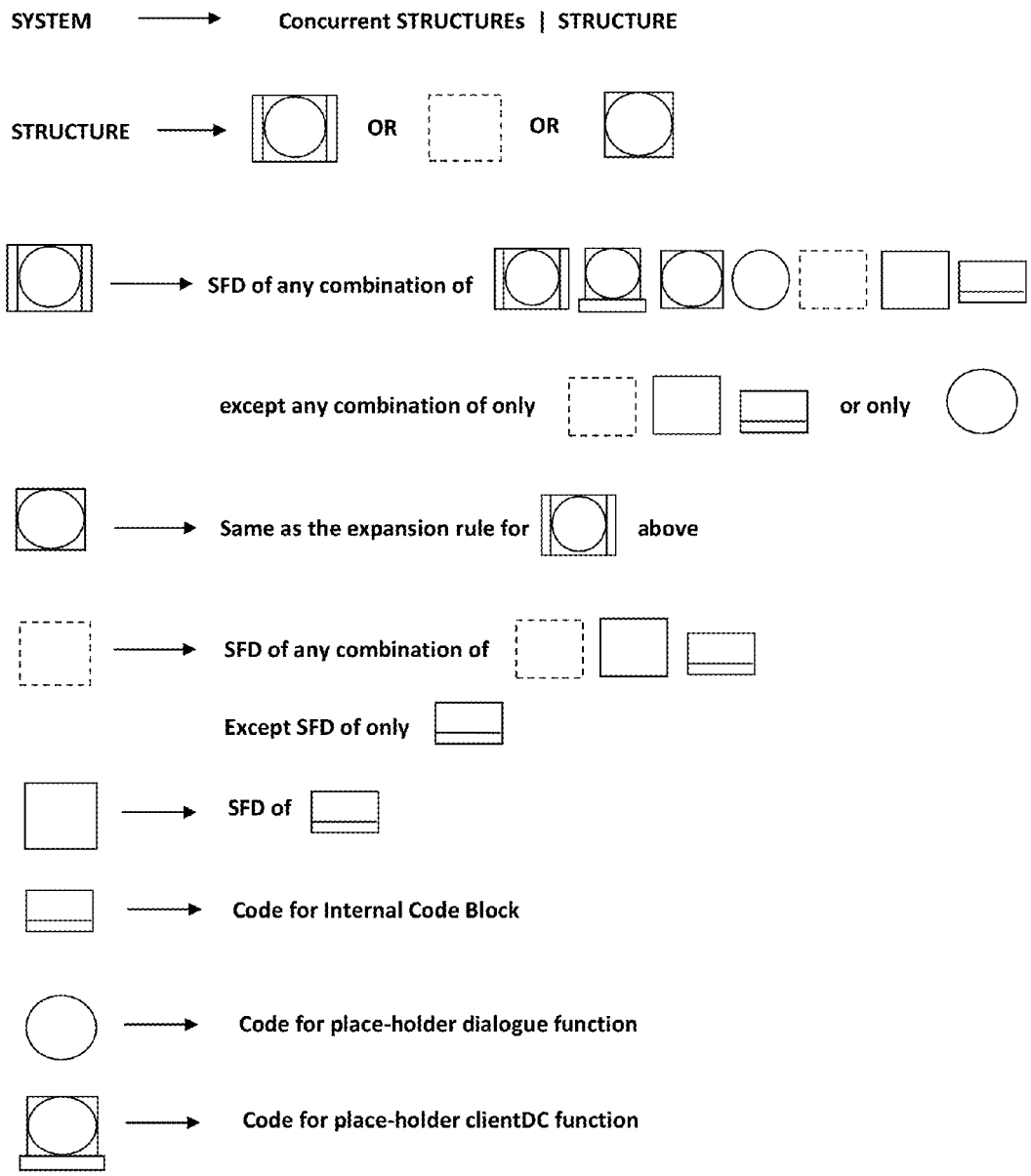
Figure 7. The grammar for the notational language for application server programs.

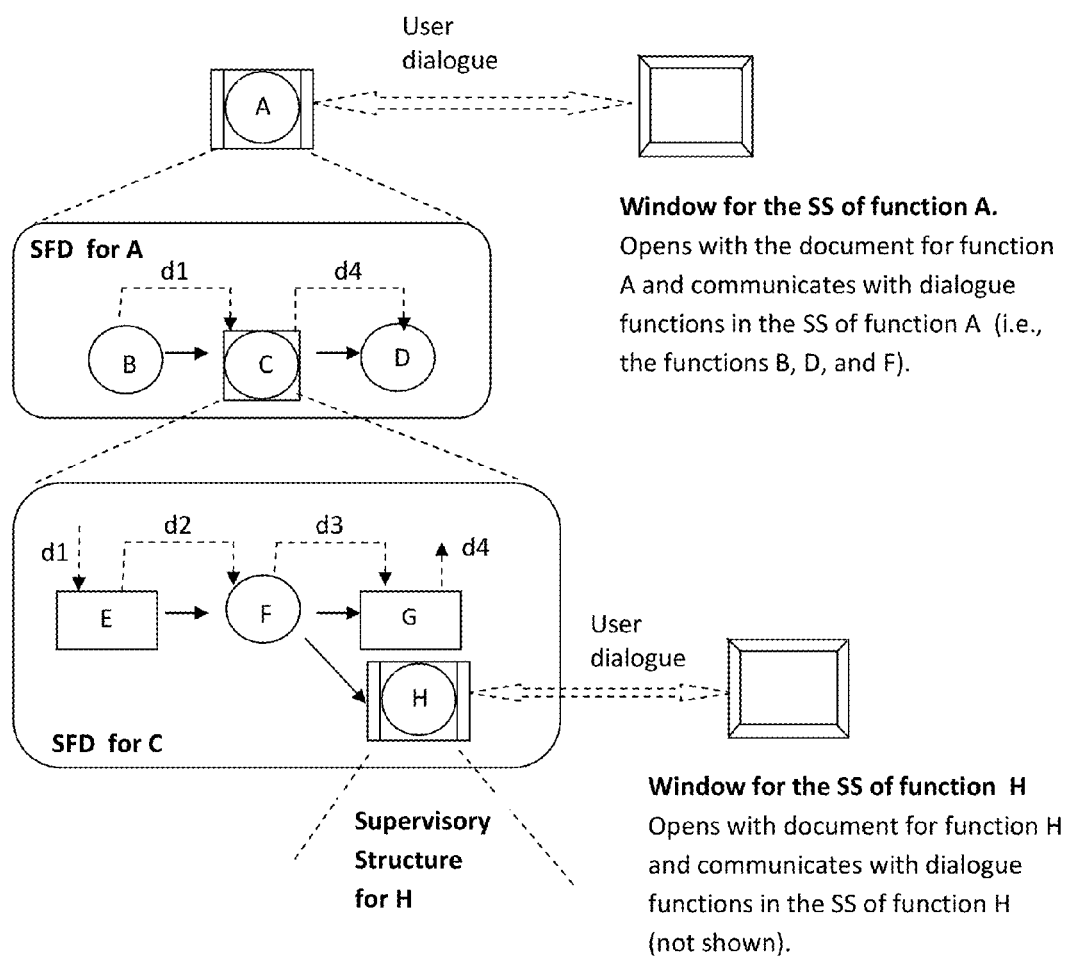
Figure 8. An example graphical interactive application program.

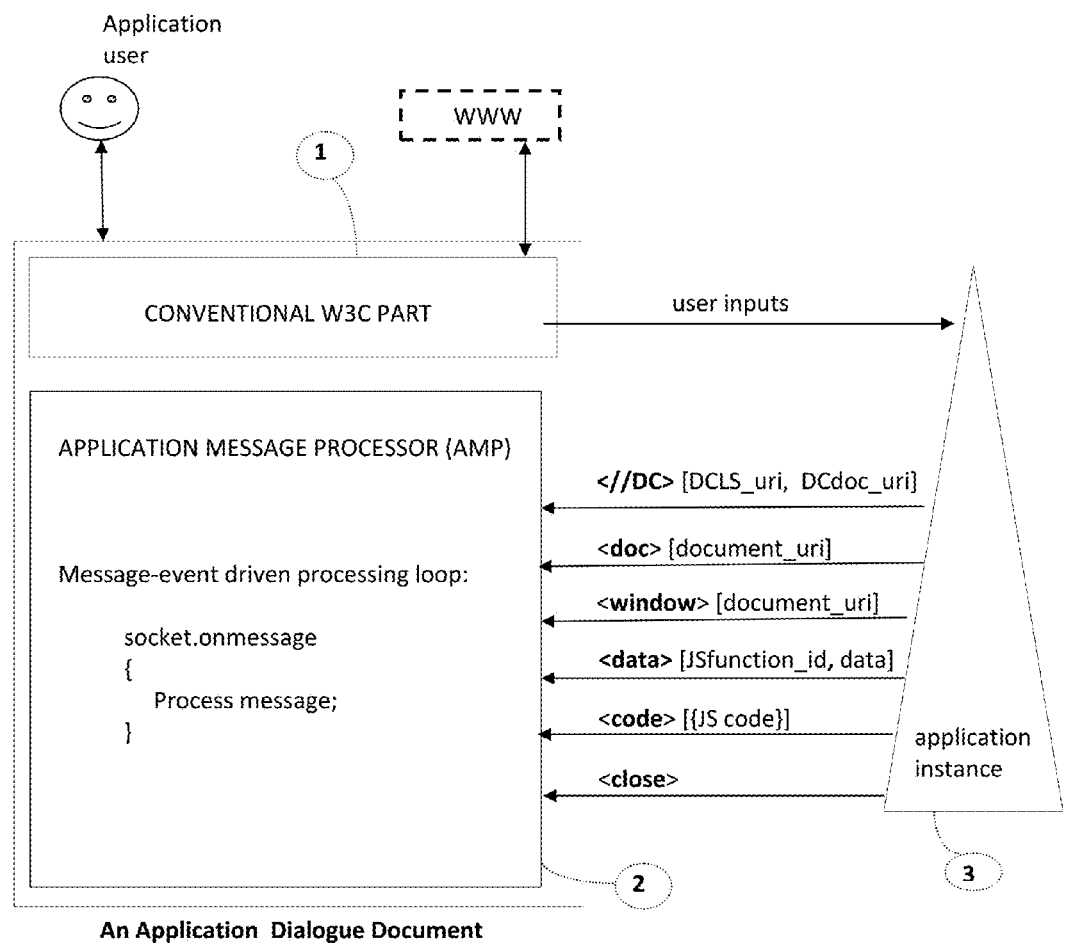
Figure 9. Dialogue document parts that communicate with an application instance.

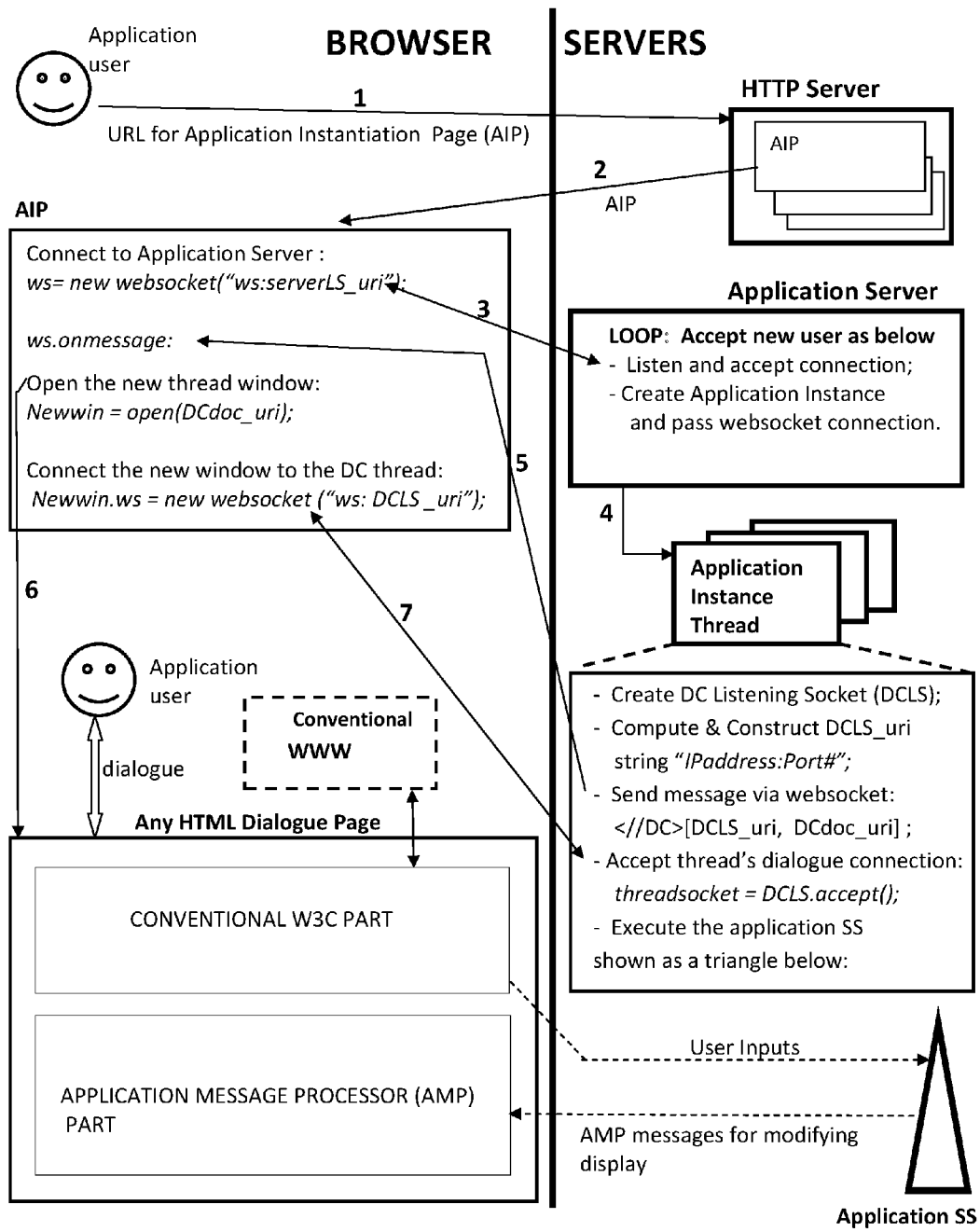
Figure 10. Example instantiation and execution of a web application.

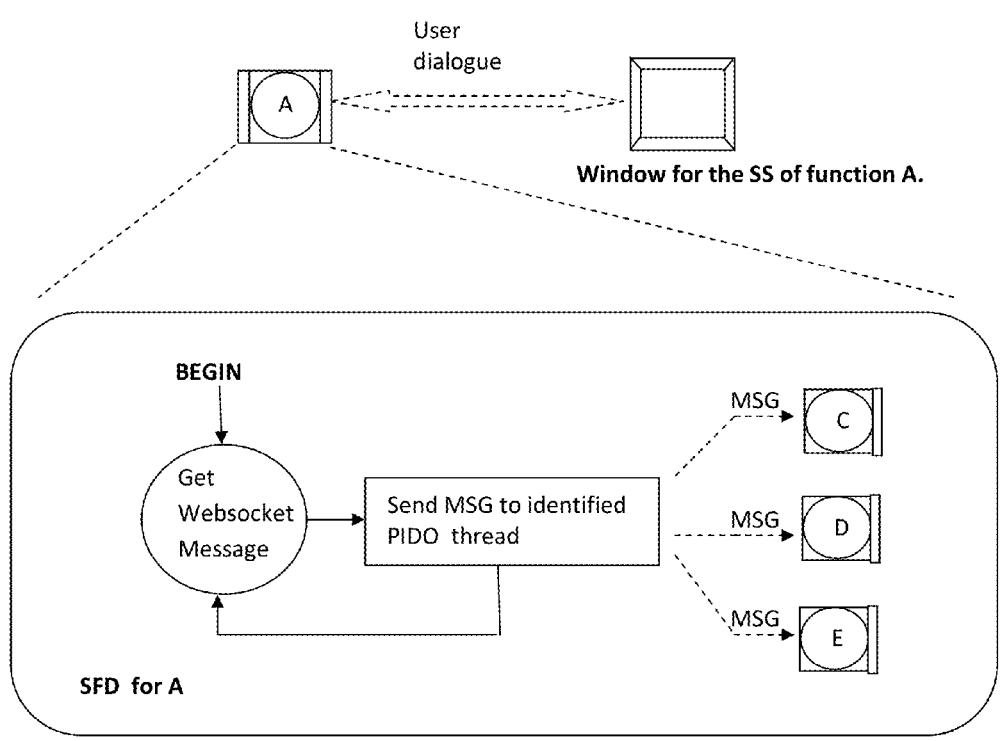
Figure 11. An example non-blocking //DC function loop-operation serving three document PIDO's.

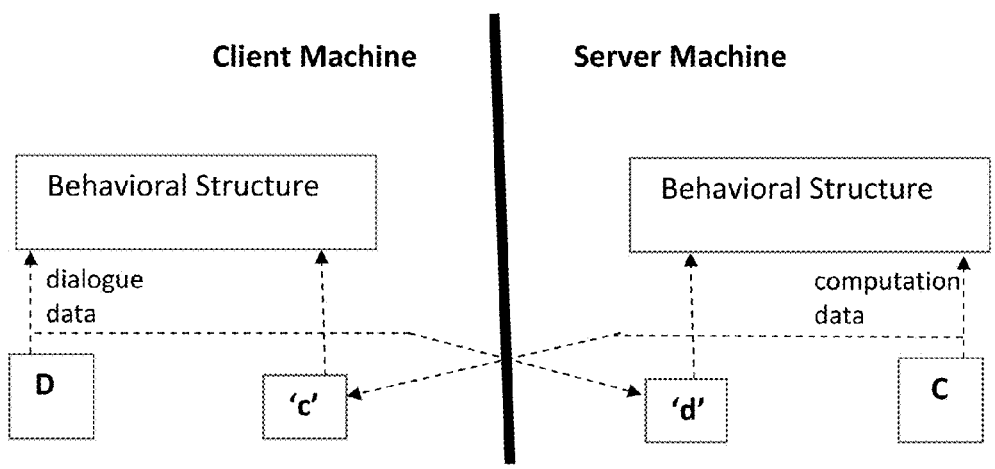
Figure 12. Dual SS application architecture.

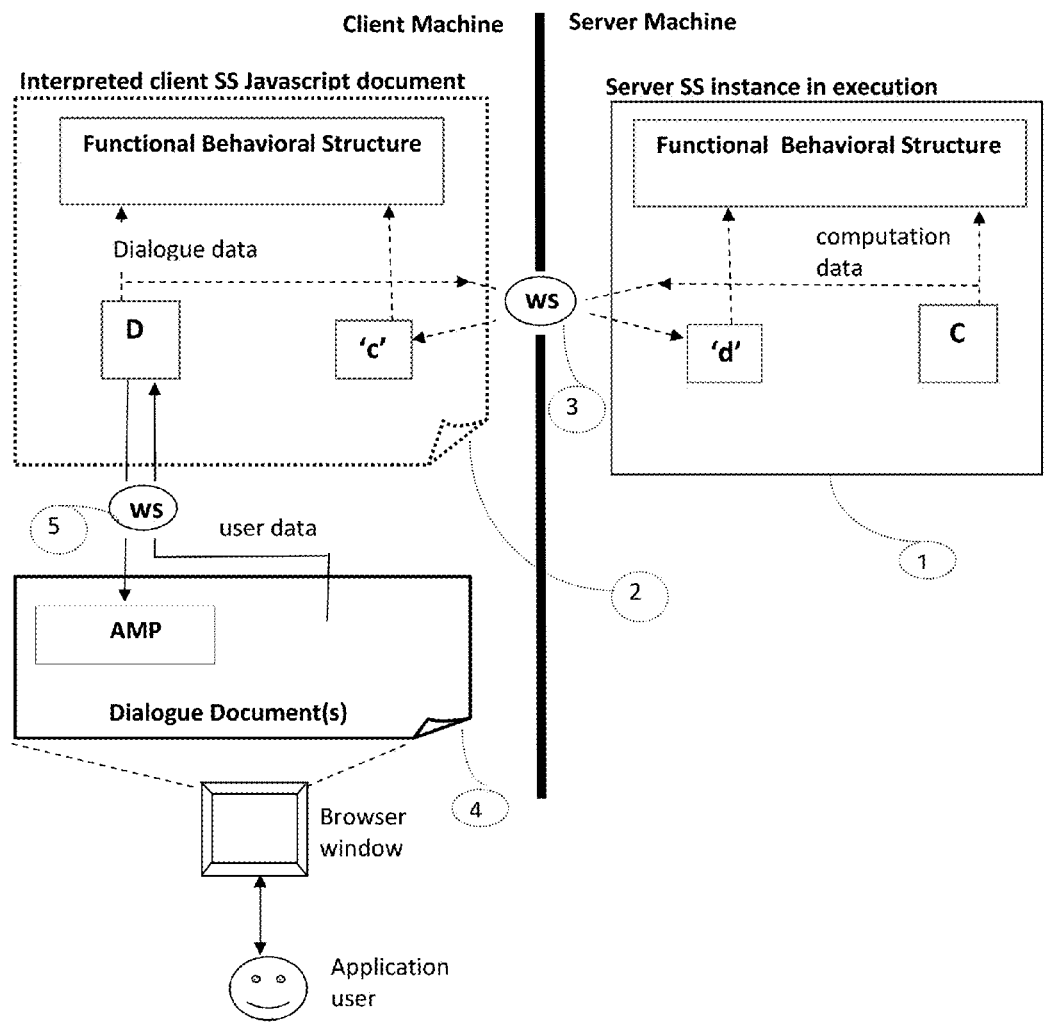
Figure 13. Execution of an application with Dual SS architecture.

US 9,986,020 B2

YUNTEN'S WEB APPLICATION METHODOLOGY AND WEB PROGRAMMING LANGUAGE (YWAM AND WPL)

This application is a continuation of U.S. patent application Ser. No. 14/045,811, filed on Oct. 4, 2013, which claims the benefit of U.S. Provisional Application No. 61/795,065 filed on Oct. 9, 2012.

Currently, there is not a comprehensive software engineering methodology for developing web applications. Most developers use ad-hoc approaches to application development and ignore the structured life-cycle based approaches of the software engineering discipline. For example, Microsoft's ASP.NET MVC recommends an application development technique called "scaffolding" for initially "generating a basic outline of your software that you can then edit and customize", and Microsoft MVC documentation comments on scaffolding as: "It saves you from the trauma of looking at a blank page and having no idea where to start!" This statement alone shows that developing a web application without an effective methodology may be a traumatic experience even for skilled software developers. Also, scaffolding may be an acceptable prototyping technique for small web applications but certainly will not help in developing large complex distributed applications such as multi-user-type enterprise applications, and, is not necessarily the best technique even for small web applications. Hence, a comprehensive methodology for developing web applications is needed.

In addition, the root cause of difficulties in most current web-application development practices is using the stateless HTTP document transfer protocol as a means for interacting with state-dependent computer-programs that utilize state-dependent user dialogue. The consequences are: (a) sophisticated and costly hacker-type approaches to application development, (b) ad-hoc development, or (c) cannot do it! On the other hand, HTTP is very much liked and it is everywhere, and all browsers use it. The solution then is: let the browser use the HTTP simply to serve its original purpose (i.e., for transferring user-dialogue documents), but let the browser use another channel for exchanging dialogue data with a stand-alone separate application program that manages its own state, and let this application program manipulate the contents of these dialogue documents through the browser while the browser by its nature (i.e., without even trying) preserves the state of the dialogue documents that it renders. This is exactly what YWAM of this invention does—it builds web application programs that implement the above-said operational model by using two different server types: HTTP server(s) and Application Server(s). This invention also integrates said methodology into a notational programming language specifically designed for developing web application systems.

SUMMARY OF THE INVENTION

The Yunten's Web Application Methodology (YWAM) develops interactive web application programs that use a web browser as a user-dialogue engine. FIG. 1 shows a high-level view of the execution of a web application developed by YWAM. As FIG. 1 shows, a client web browser interacts with two separate server types: Application Server 1 for instantiating an application instance 3, and HTTP Server 2 for delivering to the browser 4 the dialogue documents used by this application instance during its execution. These two servers can be in the same network machine or in different machines. When they are both on a user's personal computer, an application program becomes a PC program using the web browser as a GUI FIG. 1 is a generic operational view and a web application can also utilize a plurality of HTTP servers and a plurality of said application servers. This generic dual-server-type application program architecture illustrated in FIG. 1 will be referred to as Yunten's Web Application Program Architecture (YWAPA). Throughout this specification, the terms "YWAM application" and "YWAM application program" refer to a web application program developed by using this YWAPA.

FIG. 1 shows that the dialogue functions of application program 3 are separated from the rest of the application program. Contrary to conventional practice, the dialogue functions of a YWAM application program do not directly communicate with the user; they communicate with the user indirectly through the browser dialogue documents retrieved from the HTTP server 2. The dialogue functions send application-to-user data to the browser dialogue documents and receive user-to-application data from the browser dialogue documents. In the embodiment presented in this description, the browser documents and the application dialogue functions communicate through websocket connection(s). For each direction of data flow, the dialogue functions also transparently perform the required translation between "text data" used by browser documents and the "binary data" used by the application instance. The dialogue functions also manage the form and content of the browser display via the messages that they send to the browser documents.

The browser dialogue documents served by an HTTP server are text documents written in HTML and a scripting language such as Javascript. On the other hand, the application programs hosted and instantiated by an application server can be written in any programming language based on the object oriented paradigm and/or a conventional functional decomposition approach. Typically, just like in conventional program development process, the source code for an application program is developed and compiled into binary machine language code, instantiated by the application server, and executed in binary machine code. However, if desired, an application program can also be written in an interpreted language. It should be obvious to the reader that YWAM can develop a large spectrum of web applications by using a casual operating system and may not require specialized platforms to support web application development.

It is important to see that the application instance 3 in FIG. 1 does not contain any HTML code or markup language code. When the application uses a web browser as a user-dialogue engine as in this description, the dialogue functions serve as dialogue placeholders in the application program structure and serve as a bridge between the application and the web browser documents that implement the actual user dialogue. It must also be noted that an application-program hosted at an application server may be a stand-alone program whose dialogue functions can be implemented using any user interface technology. With such applications, because application functionality is totally independent of and knows nothing about HTTP, HTML, and related scripting languages, the developer of a web-application who is not involved in user-dialogue design does not need to know these technologies.

A user accesses a YWAPA application via executing at his/her browser an Application Instantiation Page (AIP) retrieved from a HTTP server. An AIP is also called Service Access Page (SAP) and these two terms are used interchangeably throughout this specification.

The AIP knows (or finds out) the URL of the application server listening socket it will connect to. The AIP connects to the application server which in response instantiates (e.g., at the server machine) an interactive program instance. This program instance and AIP together open at the client machine the user's interface to said program instance. This program instance can be the totality of the application program or it can be a part of the application program. The application server on the other hand can be a very simple program loop listening for AIP connection requests and creating a running copy of said interactive program instance for each connection request.

Any developer can install and serve an application on any network machine(s), even on his/her own PC, and an application is free to use any HTML document in any machine(s) in the world accessible by a browser. Publishing an application then is simply publishing the URL of its AIP.

A YWAM application-program instance can run at the application server machine, it can run at the client machine, or if the dual-program architecture described later in the detailed description below is used, it can simultaneously run at both the client and the server machines. If the developer wishes, he/she can develop an application as a mix of the YWAM's program architecture and current W3C technologies.

Separating the stateless HTTP protocol from application design also opens the doors for application design via established disciplined software engineering practices and methodologies rich with features for developing high quality software. The detailed YWAM embodiment in the description below extends with the concepts outlined above the "SUPERvisory Methodology And Notation (SUPERMAN) for Developing Human-Computer Systems". (SUPERMAN is the inventor's doctoral dissertation—see references: 1, 2).

BRIEF DESCRIPTION OF THE DRAWINGS

Following is the list of figures used in this description:

FIG. 1. A high-level view of execution of a WEB application.

FIG. 2. Execution of a WEB Application Program constructed as a Supervisory Structure.

FIG. 3. Supervisory structure composed of supervisory cells.

FIG. 4. Supervisory cell of a supervisory structure.

FIG. 5. An example supervisory cell and its SFD.

FIG. 6. Function symbols of a WEB application program.

FIG. 7. The grammar for the notational language for application server programs.

FIG. 8. An example graphical interactive application program.

FIG. 9. Dialogue document parts that communicate with an application instance.

FIG. 10. Example instantiation and execution of a web application.

FIG. 11. An example non-blocking //DC function loop-operation serving three document PIDO's.

FIG. 12. Dual SS application architecture.

FIG. 13. Execution of an application with Dual SS architecture.

DETAILED DESCRIPTION

The detailed YWAM embodiment presented in this description extends SUPERvisory Methodology And Notation (SUPERMAN) for Developing Human-Computer Systems [1, 2]. As such, YWAM inherits a full lifecycle methodology built into a Graphical Programming Language (GPL). For clarity of presentation, this description will also utilize the GPL notation which will be briefly described below. Other embodiments of the invention will be apparent to those skilled in the art from consideration of the specification and practice of the invention disclosed herein. The specification and examples are as exemplary only, with a true scope and spirit of the invention being indicated by the claims submitted with this description.

For clarity of presentation, the remainder of this description is divided into the following subsections:
Application Program Structure;
Browser-Document Structure and Dialogue Data Flow;
Application Instantiation Page (AIP);
Details of Creating and Executing an Application;
Accessing an Application within an Application With Parameter Passing User Friendly Responsiveness;
Scalability For Serving Large User Population;
Function Allocation Between the Client and the Server;
YWAM and MVC;
Publishing/Registering an Application;
YWAM's Dual SS Architecture;
Wider Scope of the Invention Obvious to Persons of Ordinary Skill in the Art;
REFERENCES.

Application Program Structure

FIG. 2 shows the execution of an application program developed via this YWAM embodiment that inherits and extends SUPERMAN. In FIG. 2, the generic application structure 3 of FIG. 1 is replaced with the interactive Supervisory Structure (SS) 1 of the parent methodology. As observed in FIG. 2, an SS is a tree structure consisting of a Functional Behavior Structure (FBS), dialogue functions, and computation functions. The FBS supervises the sequencing of and data communication among the dialogue and the computational functions, and the dialogue functions communicate with the browser dialogue documents which in turn communicate with the user. The FBS part of an SS is developed in the Requirements Specification phase of the software lifecycle. The dialogue and computational structures of an SS are developed in the design phase of the software lifecycle. If the developer develops the SS via the graphical programming language of the methodology, the whole SS is graphical code that is compiled into executable binary code. Hence, an application-program's supervisory structure integrates into a single representation the products of the Requirements Specification, Design, and Coding phases of the software lifecycle and eliminates costly and error-prone specification transformations through these phases.

To fully understand this YWAM embodiment, in addition to the SS components briefly described in the above paragraph, the reader needs to know some other parent methodology characteristics inherited by this embodiment. These are outlined in the following eight short paragraphs preceding the paragraph that starts with "Dialogue function". The material discussed after that is new and is specific to YWAM (unless it is stated otherwise).

FIG. 3 shows that an interactive software program is constructed as a tree structure of supervisory cells called a Supervisory Structure (SS), and an application may be composed of a plurality of communicating supervisory structures.

FIG. 4 shows that a supervisory cell, the building block of an SS, consists of a supervisory function (which specifies the function's goal) and a Supervised Flow Diagram (SFD) that specifies the operation of the supervisory function in achieving its goal.

FIG. 5 shows an example supervisory cell consisting of the supervisory function A and a very simple SFD.

The SFD in FIG. 5 shows the procedure executed by the supervisor A, and also shows both control flow and data flow. The solid arrows in the SFD show the sequence in which the supervisor A calls the functions B, C, and D. The dashed arrows show the data that the supervisor receives from the SFD functions (i.e., d1 from B, d2 from C) and the data that the supervisor passes to the SFD functions (i.e., d1 to C, d2 to D). The Graphical Programming Language compiler of YWAM would translate this supervisory cell into:

```
Function A( ) {
B(out:d1);
C(in:d1; out:d2);
D(in:d2);
}.
```

The example in FIG. 5 showed a typical supervisory cell that corresponds to what is conventionally known as a procedure, a method, or a function object. In a broader context however, a supervisory function is a placeholder for the designer's mind, and the SFD is meant to represent the operations the designer envisions in his/her mind. Hence, this ability for notational representation of operations envisioned by a designer makes possible the development of a highly expressive graphical programming language. For example, the notation for a function might indicate that the function will execute asynchronously. Likewise, the notation for a function may imply that the function will do certain things before executing its SFD and/or after executing its SFD.

A conventional (i.e., pre-WWW) interactive-software supervisory structure may contain three function types: Dialogue-Computation (DC), computation (C), and dialogue (D). YWAM extends this list with new function types: clientDC function, parallel DC (//DC) function. FIG. 6 shows the graphical symbols for these functions. These functions types are discussed below.

Dialogue-Computation (DC) Function—

A DC function is an interactive function performed by the user and the computer together. It is a high-level software function, the SFD of which may contain other lower-level DC functions, dialogue functions, and computation functions. A structure of DC function supervisory cells show the functional cooperation of the user and the application through abstract levels, and specify user requirements through functional decomposition. As indicated in supervisory structure 1 of FIG. 2, this upper portion of a supervisory structure is called the Functional Behavioral Structure or FBS. A conventional FBS is a tree structure of DC functions the bottom of which is bounded by the calls to dialogue and computational functions.

Computation Function—

This is a function which will perform only a computation. A computation function cannot communicate with the user. It can communicate with the DC functions of the FBS and/or with the computation functions of the same or other supervisory structures. Typically it receives its inputs from a DC function that invokes it (e.g., calls it) and gives the computation results back to the same DC function or to another computation function. Typically, in a client-server environment, the computation functions reside and execute at the server machine. A computation function can be a supervisory computation function or a worker computation function. The SFD of a supervisory computation function can call lower-level supervisory and/or worker computation functions. A worker computation function does not call any other function but does some computation.

Dialogue Function—

In the eyes of an observer of a program's supervisory structure, this function provides for the communication between the user and the application program (e.g., between the user and the DC functions). However, because YWAM uses browser documents for user interaction, this SS function does not communicate with the user. It serves as a dialogue placeholder in the SS and it provides for dialogue data flow between its supervisory function in the SS and a browser document that performs the actual communication with the user. In this embodiment, a dialogue function communicates with the browser documents via websocket messages. A dialogue function also performs data type conversion for data exchanged with the browser documents. Because Javascript is a typeless language and uses strings, a dialogue function does type conversion for both data-flow directions (e.g., converts an application data of a given type to a text string before sending to the browser, and converts the text string data received from the browser to the corresponding application data type before passing it to the calling supervisor). A dialogue function can also perform dialogue-related server-side-processing of dialogue data. The SFD of a supervisory dialogue function can call lower-level supervisory or worker dialogue functions.

clientDC Function—

This is a new function type specific to YWAM. It has the same semantics as a DC function but it runs at the client machine. The main purpose of this function is to reduce the work load of the server machine. This function type is used for interactive computations which can be performed at the client machine without the need for external information. At the serve machine however, just like a dialogue function, this function is a placeholder in the application program structure. When it is called at the server, this placeholder version receives its input parameters form the caller, activates the actual function at the client machine, receives the output parameters from the client machine, and passes them to its caller at the server.

Parallel DC (//DC) Function—

This is a new DC function type specific to YWAM. An example of this function is the top-most DC function of an interactive SS object that executes (e.g., at the server) as a thread (or a process). The dialogue functions of a //DC function communicate with the user through this function's private user interface (e.g., a browser window). A //DC function can contain lower level //DC functions in its structure. During execution of an application, an encounter of a //DC function results in creation of an executable thread object whose entry point is the encountered //DC function. The intent of a //DC function is to execute its own supervisory structure but first it must create and connect to its browser user interface. For this, it opens a listening socket and sends to its creator's browser window a "//DC" message that specifies this listening socket and also carries the specification for the function's browser user interface (e.g., window specs and the document URL—for simplicity, this document will assume that the browser user interface for a //DC function is a standard browser window). In response to a //DC message, the creator's browser window opens a new window for the //DC function's thread and connects this window to the thread via the thread's listening socket. After the socket connection is established, the //DC function executes its supervisory structure. The dialogue functions in the SS of this function communicate with the documents of this private window using this socket connection.

The reason a //DC function is named as such is that it is a stand-alone execution unit and more than one of these functions might be running in parallel (e.g., as a thread or a process) while each one is communicating with its own private window on the display screen. Hence, the //DC functions are used to provide the application user with multiple concurrent interfaces (e.g., browser windows, wireless devices, etc.) that interact with corresponding concurrent application supervisory structures.

The SFDs in the SS of a //DC function can contain (and hence create) other //DC functions. Each of these //DC functions behave as described above (i.e., each one executes as a thread and creates and communicates with its own private window).

The regular DC functions in the SS of //DC function are for organizing the FBS part of the SS thorough abstract levels of functional decomposition.

FIG. 7 shows the grammar for YWAM's notational Web Programming Language (WPL) for specifying the operation of interactive server programs. The function expansion rules in the grammar ensure that the system representation preserves the semantics of the functions described above. (Note: a dashed-line box represents a supervisory computation function, whereas a solid-line box represents a worker computation function. Also, a box with two bottom lines is called an Internal Code Block (ICB) and used to embed textual code in an SFD—e.g., data declarations, assignment statements, object creation, etc.).

It is important to see that the totality of a program structure derived from the grammar of FIG. 7 is binary code that runs at the application server machine(s). During execution of this structure, the dialogue place-holder functions and the clientDC place-holder functions of this structure activate via websocket messages their actual function equivalents at the client machine. These place-holder functions send their input parameters to actual client functions and receive their output parameters from these client functions. Hence, although the tasks of these functions are actually performed at the client machine, the program structure running at the server does not know this and would care less. Hence, during development of the program structure at the application server, these place-holder functions can also be used as temporary stubs.

FIG. 8 contains an example supervisory structure that conforms with the rules of the graphical grammar of FIG. 7. In FIG. 8, functions "A" and "H" are //DC functions and the SS of each of these functions executes as a thread (hence the term "parallel DC"). For example, the supervisory structure of "A" consists of two supervisory cells and executes as a thread. This thread creates its own private browser window and the dialogue function of the SS (i.e, functions B,D,F) communicate with the documents displayed in this private window. Of course, these documents are provided by the HTTP server(s) used by the application.

As FIG. 8 shows, the SS thread for function "H" is created during execution of the SS of function "A". The dialogue functions of the thread for function "H" communicates with the user via the private window of this thread. The window of a //DC thread opens with a home document for the SS it executes. However, during execution, the dialogue functions of the thread can replace and/or modify this window's document as needed.

In FIG. 8, the creation of the thread for function "H" is also an example of activation of an asynchronous non-blocking concurrent function. Here, as its SFD shows, the function "C" first calls functions "E" and "F" in sequence, then creates the asynchronous concurrent thread for function "H", and continues with calling function "G".

Following is a list of example YWAM application structures in the order of increasing level of structural complexity:

A single //DC function supervisory structure performing simple computations and displays.

A program that starts executing as a //DC function structure and, as needed according to the logic flow of the program, creates other //DC function-threads. When a //DC function completes its task (e.g., terminated by the user), its thread and window and its connection to the window die. If it needs to be recreated, both the thread and its window and its socket connection are all recreated.

A user interface that begins with multiple windows each with its own thread. (Example: An instrument control panel in which each window controls a different instrument).

An distributed enterprise system with multiple user types (i.e., a system that identifies and authenticates the user and instantiates the //DC function designed for the identified user type).

Browser-Document Structure and Dialogue Data Flow

YWAM extends a conventional W3C browser document with a new part called the Application Message Processor (AMP). FIG. 9 shows the two parts of a YWAM browser document. The conventional W3C part 1, in addition to performing all its well known standard activities, handles the document-to-application data flow (i.e., the user inputs). The programmer implements this document-to-application-program data flow via Javascript functions that send this data via the document's websocket connection to the application-program. The AMP 2 on the other hand is only for handling the application-program-to-document data flow that modifies the display. The AMP has access to a plurality of built-in, programmed, or imported Javascript functions that it uses in implementing the display directives that it receives in websocket messages sent by the application-program. FIG. 9 includes a sample subset of these messages on arrows flowing from the application instance 3 to AMP 2.

The AMP is event driven and the events processed by the AMP are the websocket messages that come from an application thread or application dialogue functions. An AMP message consists of a message type followed by the [message body]. In FIG. 9, as the text on arrows that flow from the application-program instance 3 to the AMP 2 show, some message types are: "//DC", "doc", "window", "data", "code", and "close". The AMP processes these messages as described below.

A //DC message is sent to the browser from a newly created //DC thread (e.g., created by the application server or created by an existing application thread). The message is sent by the //DC root function of the new thread. A //DC root function, before sending this message, first creates a listening socket to accept a forthcoming websocket connection request from the browser, then it sends with a //DC message the identity of this listening socket (i.e., DCLS_uri) and the URI of its home dialogue document (i.e., DCdoc_uri). The message is sent to the browser window of the thread's creator. The receiving AMP processes a //DC message as follows: it opens the new thread's user-interface window with the new thread's home document identified in the //DC message (e.g., via Javascript code: Newwin=open(DCdoc_uri)), and connects this window to the new thread via the thread's listening socket identified in the //DC message (e.g., via Javascript code: Newwin.ws=new websocket ("ws: DCLS_uri");). After the websocket connection is set up, the //DC function thread starts executing the program SS. During this execution, using the websocket connection established above, the thread's dialogue functions communicate only with the documents in the thread's dialogue window.

All other application messages in the figure (e.g., doc, window, data, code, close) come to an AMP from the dialogue functions of the SS of a thread. Upon receiving a "doc" message, the AMP replaces the window document with the document whose URL is specified in the message (e.g., via Javascript code: location.replace(DCdoc_uri)). Upon receiving a "window" message, the AMP opens a new window with the document specified in the message. The "data" message brings the name of a Javascript function which will modify the DOM and the display using the data (if any) that comes as a part of the "data" message, and, the AMP simply calls this function by passing to it the received data. For the "code" message, the AMP executes the Javascript code that comes with the message. The "close" message simply directs the AMP to close the thread's window. It is important to state that the list of AMP messages is open-ended and is not bounded by the messages exemplified above. An example addition to the above list is a "ping" message—a //DC function can perodically send a "ping" message to check if its window is still there (e.g., not closed by the user).

As FIG. 9 shows, the user inputs are processed via the conventional W3C part of a document. However, the designer decides whether these user inputs are processed via conventional W3C techniques or they are sent over the window's websocket to the YWAPA application for processing. When the latter option is used, document objects that appear as web document hyperlinks are no longer HTML hyperlinks but are user inputs that a document uses itself or sends over the websocket to the application SS thread which can use this dialogue data in a way it is programmed to do so. A YWAM dialogue document sends its data via in-line Javascript code or via event-driven Javascript code (e.g., sending FORM data to an application thread through a websocket).

Application Instantiation Page (AIP)

As stated earlier in this description, a user accesses an application or a service by executing at the browser an Application Instantiation Page (AIP) which is also called a Server Access Page (SAP). The main purpose of an AIP is to connect a user to the application program/system and open this program's user interface. As mentioned earlier, the use of an AIP results in instantiation of an interactive application program instance (e.g., at the server machine) and this interactive program instance and the AIP together set up at the client machine the user's interface to said interactive program instance. In some cases, this interactive program instance may be the totality of the application served to the user by the application server (e.g., a text editor). In some other cases, this interactive program instance may be the user's interaction interface to an already up-and-running application system such as an enterprise network system, an airline reservation system, a banking system, social networking system, etc. Yet, in some other cases, this interactive program instance may serve as the application's front-end that authenticates the user and then instantiates an interactive program instance that matches the user type. These user-type-specific interactive programs can be instantiated by a central application server or there may be a separate application server for each user-type.

An application can also offer a plurality of separate services each with its own entry function that will be invoked as a thread or a process by the application server. Each such service may be accessed via executing its own AIP. Hence, an application can have a plurality of SAPs (i.e., AIPs) providing for service selection capability.

An AIP has the same YWAM dialogue document structure that FIG. 9 shows (i.e., it consists of a W3C part and an AMP part). An AIP that does not interact with the user is invisible.

An AIP may or may not interact with the user. If it does, such AIP interaction may include user authentication and identifying the user's role in the system (e.g., an administrator, an agent, a manager, etc.). While performing these activities, the AIP may communicate with the application server.

An AIP can open multiple parallel windows for an application, and, if needed, it can open multiple parallel applications.

An AIP can be accessed via a hyperlink in a document, it can be requested by an application in execution via a document request it sends to the browser, or for applications that do not want their AIPs accessible via above methods the AIP can be in a portable storage device as a ".html" file which can be opened and executed by the user.

Details of Creating and Executing a YWAM Application

FIG. 10 is a detailed version of FIG. 1 and shows a process of creating and executing an example application-program instance. FIG. 10 also contains an example AIP. (Obviously setting up a websocket connection requires compliance with the websocket protocol handshaking, etc. For simplicity, the figure does not show these activities which can be implemented via manual programming or automatic code generation.)

The numbered arrows of FIG. 1 show the sequence of events that takes place during this process. The strings typed in italics represent sample program code or data that can be utilized during these events and are included for programming-oriented reader. These events are:

1. The application user clicks on an application hyperlink that links to the application's AIP stored at an HTTP server. (Of course, the AIP is previously developed and stored at the HTTP server. This server may also store other previously developed application dialogue documents).
2. The browser receives the AIP and starts executing it.
3. The AIP sends a connection request to the application server (not to the HTTP server) via creating a websocket object. This connection request is sent to the listening socket of the application server (i.e., identified as serverLS_uri), the IP address and the port# of which may be built into the AIP. The application server accepts the connection, and handshakes with the browser. At this point, the AIP becomes the application server's browser page, and the AMP of AIP is at "waiting for websocket message" state.
4. The application server creates an application instance as a child thread and passes to it his websocket connection his browser page (i.e., to AIP).
5. The newly created child //DC thread creates a Listening Socket (DCLS), constructs the "IPaddress:port#" URI string for this listening socket, and sends to his parent's browser page a //DC message that contains this URI string for the listening socket (e.g., called DCLS_uri) and the URI of the opening document for the thread (e.g., called DCdoc_uri).
6. The browser page of the parent receives the child thread's //DC message, and opens a new dialogue window for this //DC child thread (e.g., via Javascript code: Newwin=open('DCdoc_uri')).
7. The same browser page of step 6 above starts the websocket connection protocol for this new window (e.g., via Javascript code: Newwin.ws=new websocket ('ws: DCLS_uri')). The child thread accepts the connection request and identifies the connection as "threadsocket" and handshakes with the browser. After the handshake, the thread executes its application code (e.g., the supervisory structure shown as a triangle in FIG. 10))
8. During the execution of the SS, all thread dialogue functions use the "threadsocket" to communicate with the documents in thread's window, and any application document loaded into this window uses the same websocket connection to communicate with the application thread that owns this window.
9. If and when the execution of the SS in the thread encounters a //DC function, just like the application server did in step 4 above, it creates a //DC thread for the underlying SS and passes to it the connection to the current browser page/window. Then, steps 5, 6, 7, and 8 above apply to the new thread.

FIG. 10 also shows that a dialogue HTML document may also contain parts that talk to conventional WWW servers while utilizing various W3C technologies (e.g., AJAX). Hence, as mentioned before, a web application designer using YWAM can also utilize conventional W3C technologies as a part of his/her design.

The above protocol for creating and executing an application instance is based on the paradigm that a websocket is a property of the window object and can be accessed as a window property by all documents loaded into the window. However, some browsers may implement a websocket not as a window property but as a document property. In this case, each dialogue HTML document has to setup its own websocket connection with the application. This can be achieved by modifying the protocol of FIG. 10 as in the remainder of this paragraph. Each //DC message sent by each thread, in addition to containing the DCLS_uri and DCdoc_uri as before, also contains the identifier of the //DC function (denoted as DCid) that uniquely identifies the thread. The receiving instantiation page or AMP now stores DCLS_uri in a sessionStorage associative array (named sessionStorage.DCLS_uris) accessible by DCid, and opens the new thread window with DCdoc_uri. Then, the AMP of every document loaded in this window first retrieves from sessionStorage the DCLS_uri for the thread, and uses it to connect to the thread via a new websocket. Of course, each time it sends a new-document message to the browser, the sending thread should listen on its DCLS for a forthcoming websocket connection request.

An alternative approach to "websocket for each document" approach of the above paragraph stores the websocket of a thread-window in sessionStorage when the window is first created. Then, using the DCid as the access key, the thread's documents can retrieve it and use it. This sessionStorage approach, unlike the "websocket for each document" approach of the previous paragraph, does not require websocket creation for every document of a thread.

Instead of directly connecting to browser documents, each application instance may communicate with the browser through a Websocket Relay Station (WRS) object. The browser views the WRS as the application, and the application views the WRS as the browser. The WRS relays the data flow between the browser and the application. The browser connects to a WRS via a websocket and an application instance thread connects to a WRS via a conventional TCP socket. The advantage of using a WRS is that the WRS encapsulates the websocket creation and management process and hence simplifies the application code.

Accessing an Application within an Application with Parameter Passing

A user of an application-A document can invoke a separate application-B via an hyperlink in an application-A document that retrieves and executes an AIP of application-B. When this is done, the retrieved dialogue pages of application-B become part of the same browser session serving application-A. Hence, before invoking application B, if application-A writes into session store the data it wants to pass, then after it is instantiated, application-B browser dialogue pages can read this data from the browser's session store. Of course, the designer of application-A can do this if he knows what the parameter passing protocol is. One viable method is using a string that lists parameters in [name,value] pairs. Hence, the designer of application-B would then publish a list of services with a Service Access Page (SAP) for each service and a list of parameter-names for each service.

An example use of this parameter communication follows: an e-mail that a vendor sends to a customer displays the tracking number of a shipment as a hyperlink so that the customer can examine the shipping status. The e-mail user's click action on this hyperlink stores this tracking number in the browser's session store and executes an AIP for the tracking web service of the shipping company. The service instance of the shipping company so instantiated reads the tracking number from session store and displays for the user a shipment status page for that tracking number.

It must be noted that although the discussion above addressed data flow from one application to another, the data flow can be bidirectional (e.g., application-B above can pass back data to application-A using the same session store).

User Friendly Responsiveness

User friendly responsiveness is achieved by serving user requests in parallel without blocking. Obviously, because each //DC function by definition serves a separate parallel window, each of these windows interact with the user in parallel.

For further parallelism of intra-window user interactions, the supervisory cell for the //DC function of a window may be designed to selectively process intra-window user inputs synchronously and/or asynchronously. In a program driven by user-input events, being able to choose between synchronous and asynchronous processing of user-inputs is important. This is because user-friendly program behavior might require synchronous sequencing of some functions, and asynchronous processing of some user inputs may not always be the best choice. For example, finalizing a hotel reservation prior to finalizing an airline flight reservation might not make much sense. Likewise, some mission specific systems might require strict sequencing of some system functions. The graphical programming language of YWAM contains notation that identify synchronous and asynchronous functions as well as the notation that identifies precedence relationships to be realized while executing concurrent functions. Using this notation, one can specify an event-driven //DC function behavior that properly sequences the user-input events. Also, using this notation, the language compiler (a human or a program) or the interpreter generates the appropriate "spawn", "fork", and "wait" instructions.

Another tool for in-document parallelism is the use of Parallel Interactive Document Objects (PIDO) introduced by this invention. A PIDO is a collection of HTML elements in a dialogue document which interacts with its own application-server thread. A document can contain plurality of PIDO's each of which can interact with the user in parallel. A PIDO definition in a document can be identified in one of many ways including: (a) each element of a PIDO contains the PIDO_identifier attribute; (b) the elements of a PIDO are placed between "begin PIDO_identifier" and "end PIDO_identifier" statements; and (c) an iframe constitutes a PIDO.

FIG. 11 shows an example graphical application-server code for a function named "A" serving a document with three PIDO's symbolically named as "C", "D", and "E" whereas each PIDO interacts with a thread that has the same identifier as its own. In this example, the code for function "A" is simply a non-blocking loop which gets a user input in a websocket message and passes it to the thread of PIDO identified in the message. As the FIG. 11 notation shows, each PIDO thread is a concurrent DC function. Each such function interacts with the user via manipulating its PIDO definition via dialogue documents.

Scalability for Serving a Large User Population

When the user population is larger than what a single server can handle, YWAM uses multiple application servers. Typically, one of these servers is a supervisory server that keeps track of the number of users served by each of the other worker servers. An AIP initially connects to the supervisory server, and the supervisory server either serves the user itself or tells AIP to connect to another server that it chooses—e.g., by sending to the AMP of the AIP a CONNECT message that carries the URL of the application server that it chooses. The AIP then connects to this server (i.e., as in FIG. 10) and the user is served by the interactive program instance created by this server. Obviously, the worker servers inform the supervisory server when their users exit such that the supervisory server can keep track of the user population on each of these servers.

The above paragraph defines a server structure consisting of a supervisory server administering a set of worker servers. However, just like a supervisory function can call a lower level supervisory function, a supervisory server can redirect the connection process described above to another supervisory server in its domain. Then this latter server performs the activity described in the above paragraph, and may also repeat the activity described in this paragraph. Hence there may be a network of hierarchically organized supervisory servers.

The scalability of YWAM applications can be elevated via currently available state-of-the-art techniques such as elimination of busy waiting and asynchronous programming of functions. The graphical programming language of YWAM contains notation that identifies the functions that execute in these modes.

Function Allocation Between the Client and the Server

If a DC structure can be executed on the client machine (e.g., all its computations can be done by the client machine), the designer may decide to do this for this would reduce the load on the application server. The program notation identifies such DC functions and such a DC function structure can be automatically or manually translated into javascript code and included in scripts accessible by the AMP. When this is done for a DC function, that DC function still preserves its place in the application program structure at the application server but only as a placeholder function to invoke the actual worker javascript function at the client machine. When called at the application server, a placeholder DC function would send to the AMP a message that identifies the DC function script to execute. The same placeholder DC function may also receive the execution results (if any) through its websocket connection.

YWAM and MVC

It should be obvious by now that an interactive supervisory structure of a //DC function directly maps into MVC components of the Object Oriented paradigm. This mapping is as: the FBS is the MVC controller, the set of computational functions called by the FBS is the model, and the set of dialogue functions called by the FBS is the MVC view. For example, for the //DC function A of FIG. 8, the controller or the FBS consists of the functions A and C, the MVC model consists of functions E and G, and the MVC view includes the functions B, D, and F.

In reality, by providing for a tree structure of //DC function supervisory structures, the YWAM's notational grammar also organizes a tree-structured MVC hierarchy (or tree-structured MVC hierarchies that execute in parallel). The SS of FIG. 8 is an example of two MVC structures whereas one creates the other one dynamically during execution time (i.e., the MVC structure headed by function A creates the MVC structure headed by function H).

Publishing/Registering an Application

A YWAM application is published by publishing the URL of its AIP. This is accomplished by registering the [application_id, AIP_URL] pair at a proprietary application directory site named as YwebAIP.com. This directory can be used in a plurality of ways including:

(a) A document designer can manually examine the directory and extract the AIP URL that he/she wants to use as a hyperlink in his/her document;

(b) Within a document, the URL string "YwebAIP.com/application_id" can retrieve from YwebAIP.com a short HTML document that contains a javascript statement that retrieves and executes the AIP (e.g., window.location.assign ("AIP_URL")); or (c) A document sends to YwebAIP.com the application_id and YwebAIP.com retrieves the associated AIP and returns it to the browser.

The advantage of using options "b" or "c" above over option "a" is that the URL of the AIP is transparent to the user/document designer. Hence, the owner of an AIP can relocate the AIP with no need to inform the users of the AIP.

An alternative publishing/registering approach is to place all application AIP's in an HTTP server (e.g., called AIPserver.com) as HTML files and name these files with the associated application identifiers. Then one can retrieve an AIP simply by the URL string: "AIPserver.com/application_id". With this approach, publishing or registering an application is simply uploading the application's AIP to the AIP server.

Yet another method for registering an application is by using a top level IANA domain as the AIP_URL directory. If this domain is called ".app" for example, the in-document address of an application would be "application_name.app" and it would return the URL of the application's AIP. However, this method requires modifications to web browsers for first retrieving the URL of the AIP and then retrieving and executing the AIP.

Another method of accessing an application is by using a portable external storage device that stores the AIP of an application server as a .html file. Then, one can simply execute this .html file on any client machine and starts using an instance of the application.

YWAM's Dual SS Architecture

So far, this description covered a YWAM application architecture in which an application instance runs at the application server, and the dialogue HTML pages run at the client machine. We shall refer to this architecture as mono-SS architecture. As an alternative, FIG. 12 shows the dual-SS architecture in which both the client and the server identically execute the same Behavioral Structure (BS) part of an SS. The BS at the client machine calls the actual dialogue functions (denoted by the capital letter D in the figure) for user interaction, and the BS at the server machine calls the actual computation functions (denoted as C in the figure) for server side computation. But each dialogue and computation function, before it returns to its calling BS, sends its output data to its same-identity placeholder function (i.e., 'd' for dialogue or 'c' for computation) called by the BS in the other machine. A placeholder function has the same name and parameters as its actual function equivalent that executes at the other side. All a placeholder function does is to receive the output data of its actual-function equivalent and return it to its caller. Hence each BS receives the identical dialogue and computation results and exhibit identical behavior, and neither one knows whether it is running on the client or on the server machine.

The dual SS structures discussed above are transparent to the application developer. The developer specifies a single SS with no regard to what machine it will be running on. The YWAM compiler receives the application SS representation as an input and generates the executable dual structures and associated embedded protocol code as its output. The compiler can be a computer program or can be a software engineer who does manual compilation.

The dual SS architecture eliminates the need for remote procedure calls. Also, the concept can be applied to more than two machines such that each machine executes the same common program structure whereas each machine specific actual function sends its output data to placeholder functions in other machines. Likewise, all machines exhibit the identical behavior.

FIG. 13 shows one practical implementation of the dual SS architecture. Here, the server SS 1 is compiled binary-code instantiated as a thread by the application server and the client SS 2 is the Javascript equivalent of that server SS which is retrieved from the HTTP server. As FIG. 13 shows, the client SS establishes websocket connections both to the browser and to the server SS. Both the server SS and the client SS execute the same Behavioral Structure and use the websocket 3 for data exchange between the actual and placeholder dialogue and computational functions. The actual dialogue functions are executed in the client SS 2 and these functions talk to the HTTP dialogue pages 4 as discussed before, through a websocket connection 5.

The implementation of the operation in FIG. 13 requires that Javascript has listening socket functionality for facilitating establishment of the previously discussed websocket connection between a browser window/document and the client SS written in Javascript. In the absence of this Javascript listening socket functionality, the socket connection and communication between the browser dialogue documents and the client SS Javascript document can be facilitated through the browser's sessionStorage.

Wider Scope of the Invention Obvious to Persons of Ordinary Skill in the Art

Persons of ordinary skill in the art should conclude that following approaches stay within the scope of the invention presented in this description.

Without departing from the scope of the invention, while keeping the role of the application server of YWAM as it is, one can replace the web browser with a more effective dialogue engine, one can replace the HTML with a more expressive and more powerful dialogue specification language, and one can replace the HTTP server with a dialogue document server that can serve not only textual documents but also executable binary dialogue code.

Furthermore, as stated earlier in this description, the AMP messages presented here are exemplary only and can be extended to include further functionality. One such example functionality is storing (e.g., at an HTTP server) and retrieving the intermediate dialogue pages.

Again, for simplicity, this description excluded HTML code from the application server. But when practical, a dialogue function can generate HTML code and send it to a document's AMP for inserting into a document. This can be done by an AMP message that specifies the message type as "HTML" and carries the HTML code and its place in DOM. Hence, this is another example of expandability of the AMP messages.

Although for simplicity of presentation, this description used a separate user interface connection (e.g., a separate websocket) for each application thread, the same communication capabilities can be achieved by multiplexing a plurality of communication channels on a single websocket connection. A message dispatcher that sits between the parallel application components and their user interfaces can manage this multiplexing. Obviously, replacing websockets with regular TCP sockets when it is viable (e.g., in self-contained secure private networks) is another connection setup strategy.

This description used graphical notation in identifying various program function types. It should be obvious that the same notational semantics can be represented by using textual means (e.g., appending function type to a function's name, using a type specific color in a function's name, etc.).

Obviously, software programs that will automate the use of YWAM are within the scope of this invention. For example, a graphical Web Programming Language compiler can generate the application code associated with the notation used. An example for this is the automatic generation of //DC thread code that interacts with the browser for setting up the user interface and connecting to it. It should also be obvious to persons skilled in the art that an interactive application program running at the application server includes run-time support software for providing robust system behavior. This includes periodic "ping" messages sent by the //DC function threads to check if their user interfaces (e.g., windows) are still alive (i.e., not closed by the user). If a thread's interface is closed by the user, the thread terminates itself.

It should also be obvious to those with ordinary skill in the art that the YWAM concepts presented via the functional decomposition embodiment of this description readily applies to programs developed with the object oriented paradigm. For example, when OO approach to system development is used, the notational grammar rules of the methodology shown in FIG. 7 may produce the following classes:

a) a supervisory-structure class for each concurrently-running system-level supervisory structure;

b) a Functional-Behavioral-Structure class for each concurrent interactive supervisory structure;

c) plurality of dialogue function classes—possibly one or more such classes for each Functional Behavioral Structure;

d) plurality of computation function classes—possibly one or more such classes for each Functional Behavioral Structure; and e) YWAM protocol classes for embedding into an application the protocol activities such as interactive-thread-object instantiation and setting up the user-interface.

In the claims of this invention, a display-window is used as a preferred embodiment for the user interface, but it should be obvious to a person skilled in the art that a user interface can contain plurality of devices and plurality of interaction objects.

REFERENCES

[1] Yunten, Tamer., "A SUPERvisory Methodology And Notation (SUPERMAN) for Human-Computer System Development", in Advances in Human-Computer Interaction, Volume 1 (Google eBook)—editor: H. Rex Hartson; pp 243-278.

[2] Yunten, Tamer., "A SUPERvisory Methodology And Notation (SUPERMAN) for Human-Computer System Development", Ph.D. Dissertation, Virginia Tech Computer Science Dept., 1985.

What is claimed is:

1. A method for providing stateful interactive web applications that run outside a web browser, the method comprising:

executing, by a browser at a client machine, a browser document hereon referred to as Application Instantiation Page (AIP) configured to: (a) trigger starting of an application program instance, and (b) establish via its AMP, in response to each websocket-connected user interface request from the application program instance, a websocket connection between a said-request identified Application Program Object (APO) and a browser user interface, whereas request-identified-APO types comprises an instantiated application program object and also comprises any executable program object dynamically created by the application program during its execution, and whereas implementation choices for an APO comprises a thread and an operating system process;

triggering, by the AIP, instantiation of an application program instance having a websocket connection to the AIP, wherein said triggering comprises sending an "upgrade to websocket" HTTP request to an application server hosting an application program automatically and dynamically constructing one or more websocket-connection requests and sending them to a browser, wherein a said websocket-connection request triggers at a browser execution of the websocket connection protocol for constructing a persistent bidirectional TCP connection between a request identified application program object (APO) and an application-program user interface;

instantiating, by the application server, an instance of the application program as an APO that inherits the application server's HTML5 websocket connection with the AIP, wherein the application program is free to use any HTML document;

executing, for an APO requiring a websocket-connected user interface, the steps for establishing a websocket-connected user interface comprising:

(a) creating, by a dynamically constructed interactive APO, a listening socket with a non-reserved port and said listening socket's URI;

(b) constructing, by the APO, a websocket-connection request message carrying said listening-socket URI, and a user-interface URI;

(c) sending, by the APO, said request message to an in-execution browser document configured to respond to said websocket-connection request message;

(d) opening, by said in-execution browser document in response to said request message, a user interface identified by said user-interface URI, and connecting said user interface to the APO via said listening-socket URI; and executing a stateful interaction between the instance of the application program and the browser's user interface at the client machine; whereas a websocket connection is a persistent bidirectional TCP connection and other protocols that construct a persistent bidirectional TCP connection are alternatives to the Internet Engineering Task Force (IETF) websocket protocol.

2. The method of claim 1, wherein the AIP is loaded from a non-transitory storage medium.

3. The method of claim 1, wherein the AIP is retrieved from a HTTP server.

4. The method of claim 3, wherein the application server and the HTTP server are located at different server machines in a network.

5. The method of claim 3, wherein the application server and a HTTP dialogue document server are located at a same server machine.

6. The method of claim 1, wherein the stateful interaction further comprises: executing program logic based on stored information and user input; and reconfiguring user display, dynamically at execution time, based on stored information and executed program logic, wherein said reconfiguring comprises modifying a part of a current display, and also comprises replacing totality of a display based on program logic and stored information.

7. The method of claim 1, wherein the browser document is written in HTML and a scripting language, and wherein the application program is written in a programming language.

8. The method of claim 1, wherein the AIP comprises a browser document comprising:

a browser dialogue document configured to send user input to the instance of the application program via a websocket connection; and an application message processor (AMP) configured to receive data from the instance of the application program via the websocket connection comprising application program requests and also comprising data for display at the user interface.

9. The method of claim 8, wherein the instance of the application program includes one or more dialogue functions configured to communicate with the browser document and to translate between text data used by the browser document and binary data used by the instance of the application program.

10. The method of claim 1, wherein the application program is a document free-application program which does not contain and/or internally process or transmit its browser documents.

11. The method of claim 1, wherein a websocket connection multiplexes bidirectional data flow for one or more PIDO's wherein data flow for a PIDO is identified via a PIDO identifier, whereas said identifier is same as or maps to the PIDO's application-program thread identifier.

12. The method of claim 1, wherein a websocket connection multiplexes bidirectional data flow between plurality of concurrently running dynamically created application program objects (APO's) and their respective user interface documents, wherein data flow for an APO is identified via an APO identifier whereas an APO identifier is same as or maps to the APO's user-interface identifier thereby identifying a virtual websocket connection within the actual websocket connection, wherein, on the server machine side, a message-dispatching function de-multiplexes incoming browser messages and dispatches them to destination APO's, and wherein, on the client machine side, AMP of said message-dispatching function's browser document de-multiplexes and dispatches incoming APO messages to destination user interfaces.

13. The method of claim 12 wherein constructing a multiplexed websocket connection between an APO and its user interface comprises:
constructing, by the APO, a connection request message carrying a connection identifier uniquely identifying the APO and a user-interface URI;
sending, by the APO, said request message to an in-execution browser document configured to respond to said request message; and
opening by said browser document in response to said request message, a user interface identified by said user-interface URI, and connecting said user interface to the APO wherein said connecting comprises logically connecting the user interface to the APO by storing in browser memory a binding association between said user-interface and said APO connection identifier.

14. The method of claim 1, wherein a PIDO is connected to its associated interactive APO via a private websocket connection, wherein said connection is established by an AMP function processing a websocket-connection request from said APO carrying a listening-socket URI.

15. The method of claim 1, wherein the method is intermixed with a HTTP request-response based application, wherein said intermixing comprises executing AIP functionality within a browser document of an HTTP-based application intermixing with the method, whereas said intermixing also comprises a Yunten's Web Application Methodology (YWAM) dialogue document comprising an AMP part interacting with conventional WWW servers while utilizing various Internet Engineering Task Force (IETF) and W3C technologies.

16. The method of claim 1, wherein plurality of AIPs provide for accessing plurality of application program services, wherein each AIP is associated with one application program service.

17. The method of claim 1, wherein a browser document of a first application program started via a first AIP starts a second application program via a second AIP.

18. The method of claim 1, wherein a browser document opens multiple applications via calls to multiple AIP's.

19. The method of claim 1, wherein the method is used to transform an existing pre-web interactive application program into a web application program with a browser user interface.

20. The method of claim 1, wherein the method is used to create and use new browser capabilities via cooperation of AMP and an application program, whereas such capability is exemplified by implementation of PIDO's, whereas such capability is further exemplified by HTTP-independent implementations for Server Sent Events (SSE) and XmlHttpRequest functionalities via cooperation of an AMP and a server-machine application program.

21. The method of claim 1 wherein the method constructs no websocket connections other than the connection between the AIP and the application program which is constructed upon AIP's "upgrade to websocket" HTTP request to the application server, and wherein said websocket connection multiplexes one or more application-program-requested connections each connecting a user interface and an associated APO, and wherein the AIP dispatches incoming application program messages to destination user interface documents via its AMP and multiplexes outgoing messages from these user interface documents in said websocket connection.

22. The method of claim 1 wherein embodiment alternatives for one or more multiplexing websocket connections comprise: (i) the application program's websocket connection to the AIP constructed in response to AIP's "upgrade to websocket" HTTP request, (ii) one or more websocket connections the construction of which are requested by the application program from the browser, (iii) a combination of "i" and "ii" above.

23. The method of claim 1 wherein the AIP is not a part of an interactive web application program but is a stand-alone utility page with functionality comprising starting an application instance and providing for opening its websocket-connected user interface.

24. The method of claim 1 wherein a child APO inherits a websocket connection constructed by its parent.

25. The method of claim 1, wherein a browser page opens a user interface and connects to it a websocket connection to an application program.

26. A method for constructing a websocket (WS) connection between a client-machine browser user interface of a web application program and an application program thread encapsulating an interactive functionality of the web application program, wherein the standard Internet Engineering Task Force (IETF) WS connection protocol for constructing said connection is triggered by the thread via a WS-connection-request message that it sends via a pre-existing TCP connection to an in-execution browser document configured to respond to said request by starting the WS connection protocol using the information supplied by said message, wherein said message supplies what the browser needs to know for constructing the WS connection comprising, in addition to a specification of the user interface the thread requests, the URI string for a listening socket the thread dynamically creates at execution time via an operating system service that allocates the listening socket uniquely to the thread, and wherein the thread listens on said socket for a forthcoming browser message that starts the WS connection protocol and wherein the thread completes the protocol by interacting with the browser and whereby the browser document code hides from an observer of the document the value of the listening-socket's URI, and further, because the listening socket is directly associated by the thread through the operating system, the listening socket intrinsically implements the server-machine path information for the application program functionality encapsulated in the thread, and thereby the method eliminates the programming effort for explicitly specifying, in the document's W3C-specification compliant WS API code, the [IP address , port number] values and path string for application program functionality encapsulated in the thread, and further, at the application program side of the connection, for a websocket message is directly delivered via the operating system to the thread the method eliminates programming effort for processing path information for delivering an incoming websocket message to the thread, the method comprising
(a) creating, by the thread, a listening socket with a non-reserved port and said listening socket's URI;
(b) constructing, by the thread, a websocket-connection request message carrying said listening-socket URI, and a user-interface URI;
(c) sending, by the thread, said request message to an in-execution browser document configured to respond to said websocket-connection request message; and
(d) opening, by said in-execution browser document in response to said request message, a user interface identified by said user-interface URI and connecting said user interface to the thread via said-listening-socket URI;
whereas a said thread comprises a web application program instance instantiated by an application server and also comprises an executable program object dynamically created by the web application program during its execution, whereas an operating system process is an alternative to a said thread; and whereas a websocket connection is a persistent bidirectional TCP connection and other protocols that construct a persistent bidirectional TCP connection are alternatives to the Internet Engineering Task Force (IETF) websocket protocol.

27. The method of claim 26, wherein the method connects a thread to an in-execution browser document wherein the connection request message either excludes a user-interface-URI or carries a URI for the in-execution browser document.

28. The method of claim 26, wherein a websocket-connection request message sent from a thread to a browser includes a character-string identifier that uniquely identifies the thread sending the message.

29. The method of claim 26, wherein a connection request message, in addition to containing a listening socket uri (LS_uri) and a user interface uri, also contains a character-string identifier for said-thread-encapsulated application program object sending the request, and wherein the receiving browser document stores in browser memory the association between the LS_uri and the application program object_identifier, and opens the new user interface using the user_interface_uri, and thereon every document running in said user interface upon request of said application program object retrieves from browser memory the LS_uri for the application program object and uses said listening socket to connect to the application program object via a new websocket connection.

30. A method for implementing structured interactive web application programs wherein the method separates application-program code that generates an application-program's functional behavior from HTML and Javascript code that interacts with a user, the method comprising:
starting execution of, by a computer processor, an entry function of an interactive application program wherein said entry function is connected, via a websocket connection, to a browser user-interface document containing an application message processor (AMP) configured to dynamically construct, in response to each websocket-connected user interface request message from the application program, a websocket connection between a said-request-specified web-browser-implemented user interface and a dynamically created interactive application program object (APO) submitting said request;
executing, by the high-level entry function, a software procedure comprising calls to any combination of one or more DC functions, one or more //DC functions, one or more dialogue (D) functions, and one or more computational (C) functions, whereas said called functions are lower level functions derived through functional decomposition of the calling function in compliance with the WPL grammar;
executing by a called DC function, if any, a software procedure comprising function calls as described in above "executing" activity;
creating and executing, for a called //DC function, if any, a concurrent thread containing the //DC function, wherein, first constructing the thread's websocket-connected user interface by sending to the browser an interface-request message with a listening-socket URI coupled with a user-interface URI programmatically declared as a property of the //DC function; and next executing via said //DC function in the thread a software procedure comprising function calls as described in above "executing" activity, whereas an operating system process is an alternative to said //DC function thread;
recursively repeating above "executing by a called DC function" and "creating and executing" activities wherein said recursive repetition generates execution paths of an application program with a tree structure of function calls comprising DC and //DC functions as nodes and comprising calls to D and C functions as leaves, wherein said tree structured program, named Functional Behavioral Structure (FBS), executes and generates functional behavior of an application program through levels of functional decomposition while sequencing and executing D and C functions;
implementing, by D functions, communications between the FBS and browser-executed user interface documents; and
implementing, by C functions, non-interactive computational functionality of the application program and associated data communications with the FBS;
whereby, the above used software function types DC, //DC, D, and C are defined as:
"DC" stands for Dialogue-Computation function which is a high level interactive software function that manages execution sequencing of and data communications between dialogue and computation functions; every DC function is a supervisory function;
"//DC" stands for a supervisory DC software function concurrently running as a server thread or a process which owns an asynchronous private window as its user interface;
"C" stands for a computational software function which can only perform or call computational functions and has no user dialogue in its underlying structure;
"D" stands for un application server software a dialogue function whose activities include:
i) invoking a client-side AMP function via a websocket message which carries the function's input parameters;
ii) receiving from a client machine websocket messages carrying user inputs;
iii) translating application data outgoing to a browser into text and translating incoming browser textual data into application data types and structures used by the application program;
whereas, totality of a program tree structure composed of function nodes for DC, //DC, C, and D functions is called a Supervisory Structure (SS), whereas a dynamically created APO comprises a thread and also comprises an operating system process; whereas a websocket connection is a persistent bidirectional TCP connection and other protocols that construct a persistent bidirectional TCP connection are alternatives to the Internet Engineering Task Force (IETF) websocket protocol.

31. the method of claim 30, wherein the SS is capable of being compiled into executable binary code according to the SS grammar rules.

32. The method of claim 30, wherein a dialogue function communicates with a browser user-interface document via websocket messages, or a session store of a browser, or inter-window messages.

33. The method of claim 30, wherein each SS of the dual-SS architecture contains a same FBS and a particular client machine and a server machine in a client-server environment execute said same FBS.

34. The method of claim 33, wherein a supervisory function at the client machine calls an actual dialogue function and the actual dialogue function sends its output data to its corresponding placeholder function at the server machine.

35. The method of claim 33, wherein a supervisory function at the server machine calls an actual computation function and the actual computation function sends its output data to its corresponding placeholder function at the client machine.

36. The method of claim 30, wherein the method is used for program-controlled sequencing of dialogue documents, and further used for program controlled sequencing of user dialogue within a document.

37. The method of claim 30, wherein the method is used for hiding internals of its web pages behind an explicit application behavior representation.

38. A method for providing interactive web applications via dual-Supervisory Structure (SS) providing stateful interactive web applications, where a particular client machine and a server machine in a client-server environment execute a same Functional Behavioral Structure (FBS), the method comprising:
   executing, by a browser at a client machine, an Application Instantiation Page (AIP) configuring parts of an application program, wherein the AIP comprises a browser document and the AIP is not a part of an interactive web application program but is a utility page;
   triggering, by the AIP, instantiation of an application program thread with a websocket connection to the AIP, wherein said triggering comprises sending an "upgrade to websocket" HTTP request to an application server hosting the application program, and wherein said request starts the HTML5 websocket connection protocol which the AIP and the application server complete via the protocol's handshake and get connected via a websocket connection;
   instantiating, by the application server, a server-machine instance of the application program that inherits the server's HTML5 websocket connection with the AIP;
   Sending to the AIP, by the server-machine instance of the application program, a listening socket URI;
   downloading, by the AIP, into the client machine a client-machine instance of the application program and passing to it said listening socket URI;
   starting, by the client-machine instance of the application program, the HTML5 websocket connection protocol using said listening socket URI and establishing a websocket connection to the server-machine instance of the application program;
   opening, by the AIP and the client-machine instance of the application program, a user interface at the client machine for interaction between the user and the FBS of the client-machine instance of the application program; and
   executing the application-program's FBS at both machines in parallel wherein each actual dialogue function of the FBS at the client machine sends its output data to its corresponding FBS placeholder function at the server machine and each placeholder computation function of the FBS at the client machine receives its output data from its corresponding FBS actual function at the server machine, thereby both FBS's executing identically, whereas the FBS at the client machine is executed by the browser or is executed outside the browser by the host operating system, whereas a websocket connection is a persistent bidirectional TCP connection and other protocols that construct a persistent bidirectional TCP connection are alternatives to the Internet Engineering Task Force (IETF) websocket protocol.

39. The method of claim 38, wherein the application-program's FBS runs only at a client machine, wherein:
   (a) the "instantiating" operation instantiates a server-machine SS program that receives a series of computational function calls from the client machine FBS through a websocket connection and returns computation results to corresponding calling functions through the websocket connection; and
   (b) the "executing" operation replaces the dual FBS data exchange mechanism of claim 38 with the client-machine-FBS's placeholder computational functions remotely calling actual computational functions of the server-machine SS program through the websocket connection.

* * * * *